J. B. RICHARDSON.
TWINE HOLDER.
APPLICATION FILED JULY 3, 1915.
1,221,593.
Patented Apr. 3, 1917.
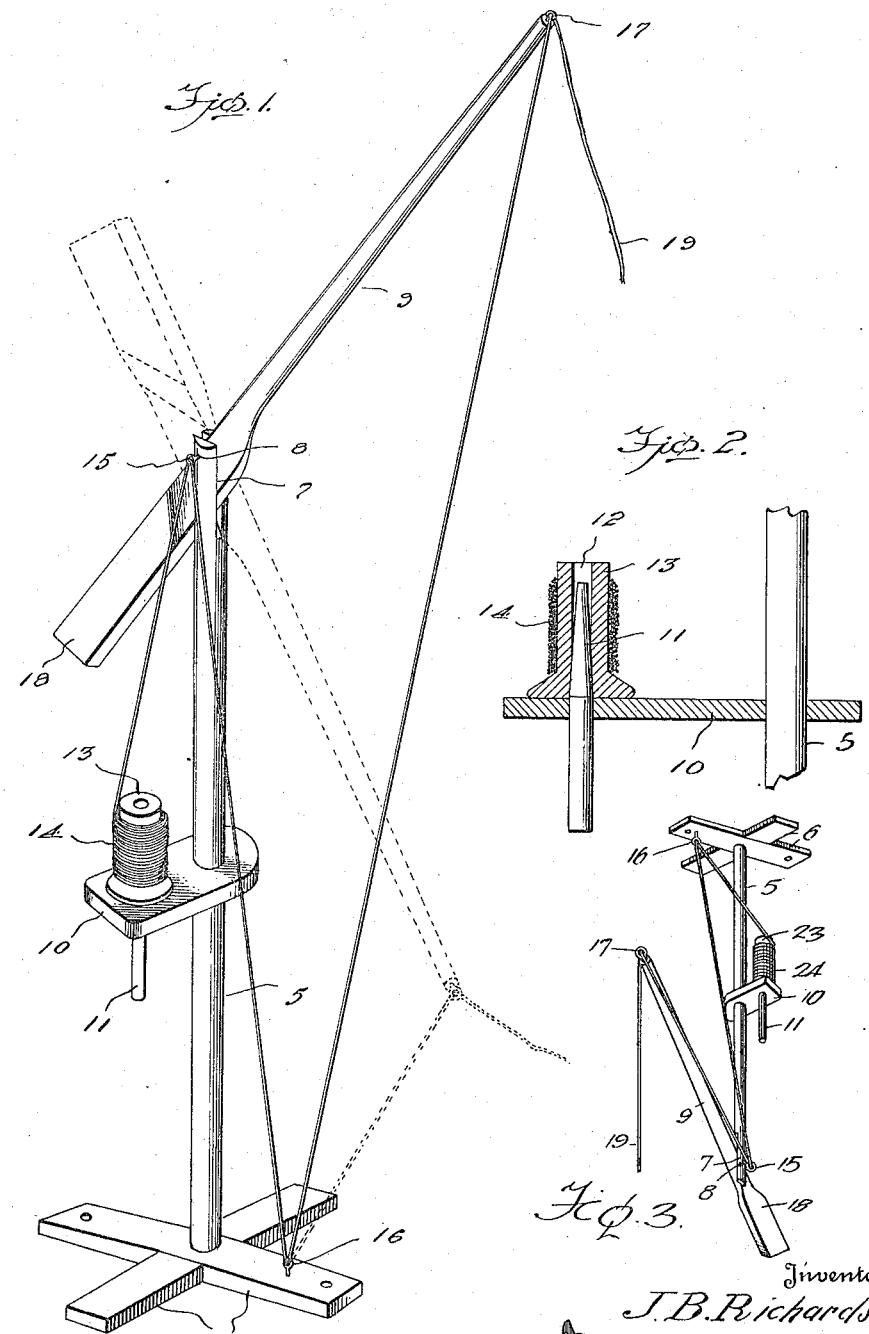
Inventor
J. B. Richardson

UNITED STATES PATENT OFFICE.

JACKSON B. RICHARDSON, OF FISK, MISSOURI.

TWINE-HOLDER.

1,221,593.     Specification of Letters Patent.     Patented Apr. 3, 1917.

Application filed July 3, 1915. Serial No. 37,902.

*To all whom it may concern:*

Be it known that I, JACKSON B. RICHARDSON, a citizen of the United States, residing at Fisk, in the county of Butler and State of Missouri, have invented certain new and useful Improvements in Twine-Holders; and I do hereby declare the following to be a full, clear, and exact description of the invention, such as will enable others skilled in the art to which it appertains to make and use the same.

This invention relates to twine holders, and has for its primary object to provide a simple and efficient device which may be secured upon a counter, table, or if preferred upon the ceiling of a room, and which includes means for automatically elevating the string or twine so that it will be out of the way of goods upon the counter and at the same time may be conveniently grasped by the user.

With this and other objects in view, the invention consists in the novel construction, arrangement and formation of parts as will be hereinafter specifically described, claimed and illustrated in the accompanying drawing, in which:

Figure 1 represents a perspective view of the improved twine holder.

Fig. 2 represents a fragmental sectional view through the twine spool holder.

Fig. 3 presents a perspective view of the improved twine holder secured to a ceiling or other elevated support and showing the method of threading the cord when fastened in this position.

Referring to the drawing in detail, wherein similar reference numerals designate corresponding parts throughout the several views, the numeral 5 indicates a standard to the lower extremity of which are secured supporting legs 6. The upper extremity of the standard 5 is bifurcated, as at 7, and the upper extremities of the bifurcations are formed with alined openings receiving a pivot pin 8. A take-up lever 9 is pivotally secured adjacent one end upon the pin 8.

A shelf 10 is secured intermediate the ends of the standard 5 and is provided with an upwardly directed tapered pin 11 adapted to be frictionally engaged within the axial bore 12 of a spool 13 of twine or the like 14.

One end of the pivot pin 8 upon which the lever 9 is pivotally mounted is looped to provide an eye 15 through which the twine 14 is first passed. From the eyelet or loop 15 the twine is extended downwardly through the eye of an eye-bolt 16, thence upwardly through the eye of an eye bolt 17 secured in the relatively long end of the lever 9, the opposite end of which is enlarged or weighted, as indicated at 18, to normally retain the twine carrying end thereof in elevated position.

In use, the free end 19 of the twine is gripped and the desired quantity is unwound from the spool 13, the twine passing through the several eyes 15, 16 and 17. A comparatively slight pull upon the free end 19 of the cord or twine is sufficient to lower the lever 9 to the dotted line position in Fig. 1, and when the twine is released the weighted end 18 of said lever automatically swings the latter to the position illustrated in full lines, thus elevating the free end of the twine above the counter or other object upon which the holder is supported. When the holder is secured to the ceiling or other elevated support the spool 13 is placed on the opposite face of the shelf 10 and secured in position by the tapered pin 11 and the twine or the like 14 is then threaded through the eye 16 on the base, through the eye 15 on the free end of the standard 5 and then upward to the eye 17 on the lever 9.

What I claim is:

In a twine holder adapted to be secured to either the floor or ceiling of a room, a standard, a take-up lever pivotally secured to one end thereof, a weight on one end of said lever, a supporting shelf secured intermediate the ends of the standard, extending outwardly therefrom, said shelf having an aperture therein adjacent the free end thereof, a spool adapted to be positioned on either face of said shelf to accord with the positioning of the device as a whole and having its bore alined with said aperture, and a pin having one end thereof tapered to frictionally and removably engage the walls of the aperture and the bore of the spool, whereby said spool is readily held on either face of said shelf.

In testimony whereof I affix my signature in presence of two witnesses.

JACKSON B. RICHARDSON.

Witnesses:
    CHAS. S. TATE,
    ERASTUS JONES.

Copies of this patent may be obtained for five cents each, by addressing the "Commissioner of Patents, Washington, D. C."